US012547852B2

(12) United States Patent
Kitamura

(10) Patent No.: US 12,547,852 B2
(45) Date of Patent: Feb. 10, 2026

(54) INFORMATION MANAGEMENT SYSTEM, INFORMATION MANAGEMENT DEVICE, INFORMATION MANAGEMENT METHOD, AND INFORMATION MANAGEMENT PROGRAM

(71) Applicant: MEET CO., LTD., Tokyo (JP)

(72) Inventor: Ken Kitamura, Tokyo (JP)

(73) Assignee: MEET CO., LTD., Tokyo (JP)

( * ) Notice: Subject to any disclaimer, the term of this patent is extended or adjusted under 35 U.S.C. 154(b) by 0 days.

(21) Appl. No.: 18/716,668

(22) PCT Filed: Oct. 31, 2022

(86) PCT No.: PCT/JP2022/040697
§ 371 (c)(1),
(2) Date: Jun. 5, 2024

(87) PCT Pub. No.: WO2023/105994
PCT Pub. Date: Jun. 15, 2023

(65) Prior Publication Data
US 2025/0053758 A1    Feb. 13, 2025

(30) Foreign Application Priority Data
Dec. 7, 2021    (JP) .................. 2021-198527

(51) Int. Cl.
*G06K 7/10*    (2006.01)
(52) U.S. Cl.
CPC ................. *G06K 7/10297* (2013.01)
(58) Field of Classification Search
CPC .................................. G06K 7/10297
(Continued)

(56) References Cited

U.S. PATENT DOCUMENTS 9,591,451 B1    3/2017 Knight et al.
11,901,970 B1 *   2/2024 Lutz .................. H04B 5/77
(Continued)

FOREIGN PATENT DOCUMENTS

JP    2012-226719    11/2012
JP    2013-250934    12/2013
(Continued)

OTHER PUBLICATIONS

Extended European Search Report dated Jul. 19, 2024 issued in European patent application No. 22903926.8.
(Continued)

*Primary Examiner* — Ahshik Kim
(74) *Attorney, Agent, or Firm* — Greenblum & Bernstein, P.L.C.

(57) ABSTRACT

An information management system includes: a tag information acquisition unit that acquires tag-contained information including a tag identifier for identifying an NFC tag from an end user terminal which reads information from the NFC tag; a storage unit that stores redirection information which is associated with the tag-contained information; a tag information management unit that is capable of referring to the storage unit and of transmitting the redirection information, which is associated with the tag-contained information acquired by the tag information acquisition unit, to the end user terminal; and a page creation unit that is capable of creating a page content of a redirection destination included in the redirection information from a contractor terminal which is authenticated as a contractor.

11 Claims, 5 Drawing Sheets

(58) Field of Classification Search
USPC .......................................................... 235/451
See application file for complete search history.

(56) References Cited

U.S. PATENT DOCUMENTS

| | | |
|---|---|---|
| 2015/0186541 A1 | 7/2015 | Vega |
| 2016/0291819 A1 | 10/2016 | Helfman |
| 2022/0164899 A1* | 5/2022 | Brown ............. G06K 19/06037 |
| 2022/0327303 A1* | 10/2022 | Carlson ................ G06K 7/1434 |

FOREIGN PATENT DOCUMENTS

| | | |
|---|---|---|
| JP | 2014-164493 | 9/2014 |
| JP | 2016-177528 | 10/2016 |

OTHER PUBLICATIONS

International Search Report issued in International Pat. Appl. No. PCT/JP2022/040697, dated Jan. 10, 2023.
Japanese Office Action dated May 7, 2025 issued in Japanese patent application No. 2021-198527 along with an English translation.

* cited by examiner

FIG.2

REDIRECTION INFORMATION MANAGEMENT TABLE

| STORE NAME | TAG ID | REDIRECTION SETTING | UPDATE SCHEDULE SETTING | INSTALLATION ATTRIBUTE | REDIRECTION URL (SECOND URL) | REDIRECTION DESTINATION ATTRIBUTE | | |
|---|---|---|---|---|---|---|---|---|
| A STORE | 211001 | ALREADY SET | ALREADY SET | POP ▶ | https://XXX.cou.a/ | COUPON A ▶ | SETTING CHANGE | SETTING DELETION |
| | 211002 | ALREADY SET | ALREADY SET | EXHIBIT ▶ | https://XXX.hoto.a/ | HOW-TO MOVIE A ▶ | SETTING CHANGE | SETTING DELETION |
| | 211003 | ALREADY SET | ALREADY SET | SHELF A ▶ | https://XXX.cou.b/ | COUPON B ▶ | SETTING CHANGE | SETTING DELETION |
| B STORE | 212001 | ALREADY SET | NOT SET | POP ▶ | https://XXX.ec/ | EC ▶ | SETTING CHANGE | SETTING DELETION |
| | 212002 | ALREADY SET | NOT SET | SHELF B ▶ | https://XXX.hoto.b/ | HOW-TO MOVIE B ▶ | SETTING CHANGE | SETTING DELETION |
| C STORE | 213001 | NOT SET | NOT SET | ▶ | | ▶ | SETTING CHANGE | |
| | 213002 | NOT SET | NOT SET | ▶ | | ▶ | SETTING CHANGE | |
| | 213003 | NOT SET | NOT SET | ▶ | | ▶ | SETTING CHANGE | |
| | 213004 | NOT SET | NOT SET | ▶ | | ▶ | SETTING CHANGE | |

TAG-CONTAINED INFORMATION: STORE NAME, TAG ID
REDIRECTION INFORMATION (REDIRECTION PERIOD INFORMATION): REDIRECTION SETTING, UPDATE SCHEDULE SETTING
INSTALLATION ATTRIBUTE INFORMATION: INSTALLATION ATTRIBUTE
REDIRECTION INFORMATION (REDIRECTION URL INFORMATION AND REDIRECTION DESTINATION ATTRIBUTE INFORMATION): REDIRECTION URL, REDIRECTION DESTINATION ATTRIBUTE

FIG.3

ACCESS ANALYSIS TABLE

DISPLAY PERIOD: 2021/10/1 ~ 2021/10/07

| STORE NAME | TAG ID | INSTALLATION ATTRIBUTE | REDIRECTION URL (SECOND URL) | REDIRECTION DESTINATION ATTRIBUTE | NUMBER OF CONTACTS | | |
|---|---|---|---|---|---|---|---|
| | | | | | | MEMBER | NON-MEMBER |
| A STORE | 211001 | POP | https://XXX.cou.a/ | COUPON A | 100 | 80 | 20 | USER ATTRIBUTE CHECK |
| | 211002 | EXHIBIT | https://XXX.hoto.a/ | HOW-TO MOVIE A | 200 | 150 | 50 | USER ATTRIBUTE CHECK |
| | 211003 | SHELF A | https://XXX.cou.b/ | COUPON B | 300 | 100 | 200 | USER ATTRIBUTE CHECK |
| B STORE | 212001 | POP | https://XXX.ec/ | EC | 200 | 150 | 50 | USER ATTRIBUTE CHECK |
| | 212002 | SHELF B | https://XXX.hoto.b/ | HOW-TO MOVIE B | 100 | 80 | 20 | USER ATTRIBUTE CHECK |
| C STORE | 213001 | POP | https://XXX.ec/ | EC | 400 | 200 | 200 | USER ATTRIBUTE CHECK |
| | 213002 | POP | https://XXX.hoto.a/ | HOW-TO MOVIE A | 50 | 30 | 20 | USER ATTRIBUTE CHECK |
| | 213003 | SHELF A | https://XXX.cou.a/ | COUPON A | 150 | 100 | 50 | USER ATTRIBUTE CHECK |
| | 213004 | SHELF B | https://XXX.cou.b/ | COUPON B | 200 | 80 | 120 | USER ATTRIBUTE CHECK |

TAG-CONTAINED INFORMATION: INSTALLATION ATTRIBUTE INFORMATION, REDIRECTION INFORMATION
ACCESS ANALYSIS INFORMATION
USER INFORMATION

INFORMATION MANAGEMENT SYSTEM, INFORMATION MANAGEMENT DEVICE, INFORMATION MANAGEMENT METHOD, AND INFORMATION MANAGEMENT PROGRAM

TECHNICAL FIELD

The present disclosure relates to an information management system, an information management device, an information management method, and an information management program.

BACKGROUND ART

In recent years, short-range wireless communication using an electronic tag such as an NFC (near field communication) tag has been put to practical use in a large variety of situations. For example, an electronic tag is attached to an advertisement poster or a product, an information terminal such as a smartphone is held up to the electronic tag, and the smartphone can thereby be caused to display a website about the advertisement or the product. Further, a technique for managing such an electronic tag has been developed (see Patent Literature 1, for example).

CITATION LIST

Patent Literature

Patent Literature 1: Japanese Patent Laid-Open No. 2013-250934

SUMMARY OF INVENTION

Technical Problem

However, it is anticipated that use of electronic tags will further increase in the future. Accordingly, a technique is desired in which a large number of NFC tags are more efficiently managed.

The present disclosure has been made for solving such a problem, and an object thereof is to provide an information management system, an information management control device, an information management method, and an information management program that can more efficiently manage information about an electronic tag.

Solution to Problem

In order to achieve the above-described object, an information management system according to the present disclosure includes: a tag information acquisition unit that acquires tag-contained information including a tag identifier for identifying an electronic tag from an information terminal which reads information from the electronic tag; a storage unit that stores redirection information which is associated with the tag-contained information; a tag information management unit that is capable of referring to the storage unit and of transmitting the redirection information, which is associated with the tag-contained information acquired by the tag information acquisition unit, to the information terminal which reads the information from the electronic tag; and a page creation unit that is capable of creating a page content of a redirection destination included in the redirection information from an information terminal which is authenticated as a contractor.

Further, in order to achieve the above-described object, an information management device according to the present disclosure includes: a tag information acquisition unit that acquires tag-contained information including a tag identifier for identifying an electronic tag from an information terminal which reads information from the electronic tag; a storage unit that stores redirection information which is associated with the tag-contained information; a tag information management unit that is capable of referring to the storage unit and of transmitting the redirection information, which is associated with the tag-contained information acquired by the tag information acquisition unit, to the information terminal which reads the information from the electronic tag; and a page creation unit that is capable of creating a page content of a redirection destination included in the redirection information from an information terminal which is authenticated as a contractor.

Further, in order to achieve the above-described object, in an information management method according to the present disclosure, a computer executes: a tag information acquisition step of acquiring tag-contained information including a tag identifier for identifying an electronic tag from an information terminal which reads information from the electronic tag; a tag information management step of referring to a storage unit which stores redirection information associated with the tag identifier, and of transmitting the redirection information, which is associated with the tag-contained information acquired by the tag information acquisition step, to the information terminal which reads the information from the electronic tag; and a page creation step of creating a page content of a redirection destination included in the redirection information from an information terminal which is authenticated as a contractor.

Further, in order to achieve the above-described object, an information management program according to the present disclosure is an information management program causing a computer to execute: a tag information acquisition step of acquiring tag-contained information including a tag identifier for identifying an electronic tag from an information terminal which reads information from the electronic tag; a tag information management step of referring to a storage unit which stores redirection information associated with the tag identifier, and of transmitting the redirection information, which is associated with the tag-contained information acquired by the tag information acquisition step, to the information terminal which reads the information from the electronic tag; and a page creation step of creating a page content of a redirection destination included in the redirection information from an information terminal which is authenticated as a contractor.

Advantageous Effect of Invention

In an information management system, an information management device, an information management method, and an information management program of the present disclosure that use the above means, information about an electronic tag can more efficiently be managed.

BRIEF DESCRIPTION OF DRAWINGS

FIG. 2 illustrates a display example of a redirection information management table.

FIG. 3 illustrates a display example of an access analysis table.

DESCRIPTION OF EMBODIMENT

Embodiments of the present disclosure will hereinafter be described. Note that in the present disclosure, an "electronic tag" is a tag which is referred to as an IC tag, an RF tag, or a wireless tag and which uses an RFID (radio frequency identification) technique for reading and writing data of an IC chip in the tag in a non-contact manner by using a wireless electric wave. An "NFC tag" is one standard of the electronic tag and is a tag which uses a frequency of 13.56 MHz and uses short-range wireless communication, a communication range of which is approximately 10 cm and is comparatively shorter than those of other RFIDs. In the following embodiment, a description will be made about an example where the NFC tag is used as the electronic tag, but the electronic tag is not limited to the NFC tag. Another electronic tag may be used which uses short-range wireless communication using a similar range to that of the NFC tag.

<Configuration>

Figure 1:
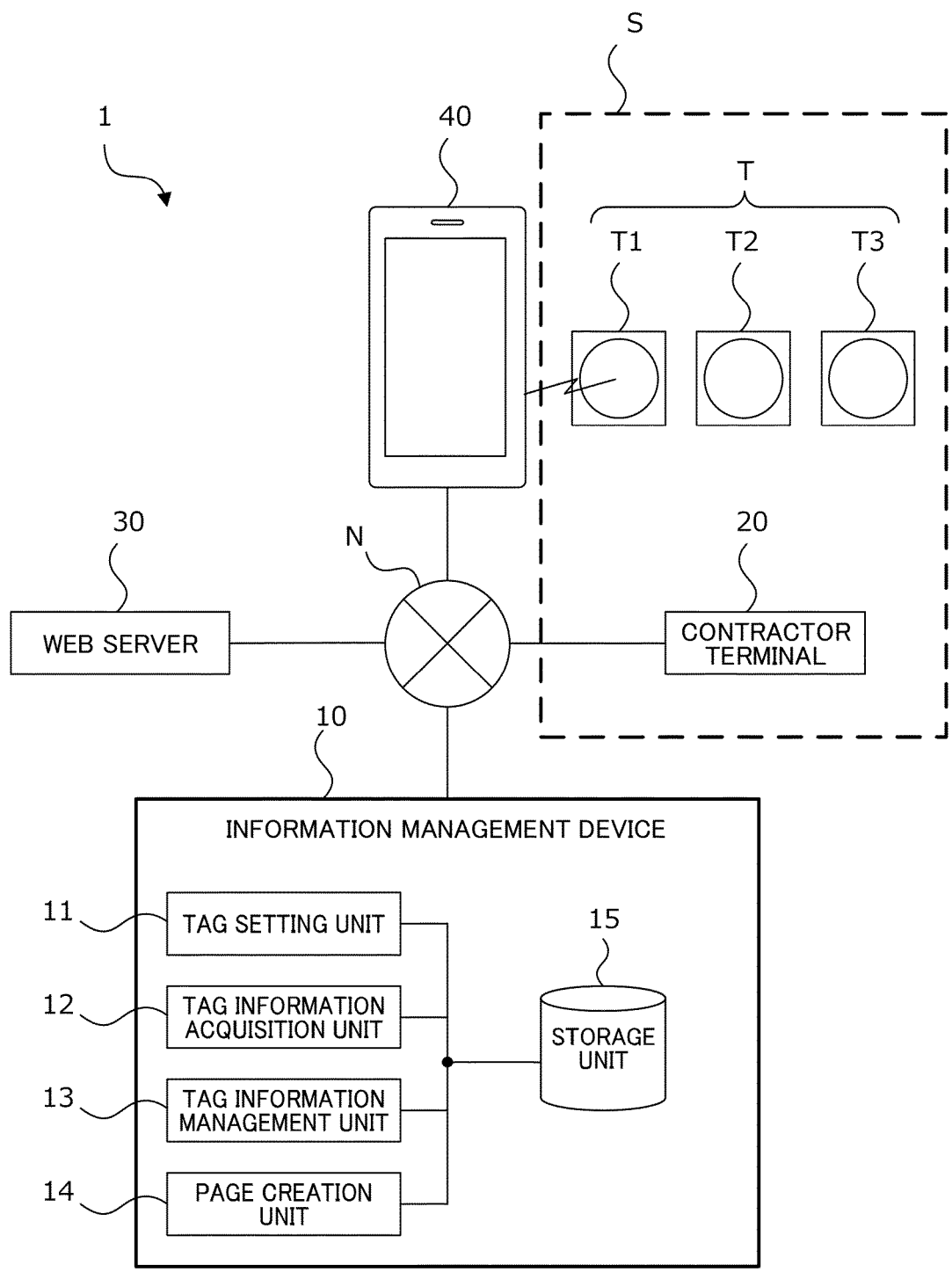
FIG. 1 is a system configuration diagram illustrating an information management system according to an embodiment of the present disclosure.

FIG. 1 is a system configuration diagram illustrating an information management system 1 including an information management device 10 according to the embodiment of the present disclosure. As illustrated in FIG. 1, in the information management system 1 according to the embodiment of the present disclosure, the information management device 10, a contractor terminal 20, a web server 30, an end user terminal 40 are connected together via a communication network N such as the Internet.

The information management device 10 is an information processing terminal under management of a service provider which provides services using a plurality of NFC tags T. The information management device 10 of the present embodiment is assumed to be a server but may be another information terminal such as a personal computer, a smartphone, a tablet terminal, or a cellular phone.

The contractor terminal 20 is an information processing terminal under management of a contractor which has made a contract with the service provider. The information management device 10 of the present embodiment is assumed to be a personal computer but may be another information terminal such as a server, a smartphone, a tablet terminal, or a cellular phone.

The web server 30 may be a common web server and may be under management of the service provider or may be under management of another party. Further, a function of a web server may be provided as a part of the information management device 10. So-called web pages are stored in the web server 30. A web page includes content information such as texts, images, and movies and functions such as an account authentication function and a settlement function.

The end user terminal 40 is an information processing terminal which is possessed by a general customer (end user) who receives the services of the contractor. The end user terminal 40 of the present embodiment is assumed to be a smartphone but may be another information terminal such as a server, a personal computer, a tablet terminal, or a cellular phone.

Each of the information processing terminals includes an input unit, a display unit, an information processing unit, and a storage unit. At least the information management device 10 has a writer function which is capable of editing tag-contained information of the NFC tag T, and at least the end user terminal 40 has a reader function which is capable of acquiring the tag-contained information by holding up the end user terminal 40 to the NFC tag T. Note that FIG. 1 illustrates three NFC tags T1, T2, and T3 as examples, but the number of NFC tags T is not limited to that. Those NFC tags T are sticker-type tags, for example, and are pasted on a product, a poster, and so forth, for example, in a store S of the contractor. In the following, each configuration will be described in detail.

The information management device 10 includes a tag setting unit 11, a tag information acquisition unit 12, a tag information management unit 13, a page creation unit 14, and a storage unit 15.

The tag setting unit 11 has a function for performing initial setting for the NFC tag T to be provided to the contractor by using the writer function included in the information management device 10. This initial setting for the NFC tag T is performed mainly before the NFC tag T is provided to the contractor. In the initial setting, the tag setting unit 11 causes an IC chip, which is provided in the NFC tag T, to store the tag-contained information. The tag-contained information includes a tag ID (tag identifier) for identifying the NFC tag T and first URL information for accessing the information management device 10, for example.

The tag information acquisition unit 12 has a function for acquiring the tag-contained information from the end user terminal 40 which has read the tag-contained information from the NFC tag T, via the communication network N. On the end user terminal 40 side, the end user terminal 40 reads the tag-contained information from the NFC tag T, thereby acquires the first URL information included in the tag-contained information, and accesses the information management device 10 based on the first URL information. Then, the end user terminal 40 transmits the read tag-contained information to the information management device 10. Further, the end user terminal 40 transmits, together with the tag-contained information, user information stored in the end user terminal 40 to the information management device 10. The user information includes user attribute information such as information about whether or not the user is a member of the contractor (member information). The user attribute information is information which is used for an access analysis which will be described later. Note that in the user information, a part or whole of personal information such as address, name, age, and sex of the user may be included in the user attribute information.

The tag information management unit 13 has a function for referring to the storage unit 15 and for transmitting, to the end user terminal 40, redirection information which is associated with the tag-contained information acquired by the tag information acquisition unit 12. The redirection information includes redirection URL information (second URL information) of a redirection destination, redirection destination attribute information, and redirection period information. Further, the tag information management unit 13 is capable of editing (making, changing, and deleting) information for the storage unit 15. In addition, the tag information management unit 13 is capable of performing an analysis process based on information stored in the storage unit 15 and is capable of performing an access analysis based on the user information.

The page creation unit 14 has a function for creating a page content of the redirection destination included in the redirection information from the contractor terminal 20 which is authenticated as the contractor. Authentication of the contractor is performed by receiving an input of identification information or password information which is set for each contractor from the contractor terminal 20. In creation of the page content of the redirection destination, the page creation unit 14 accesses the web server 30 of the redirection destination and performs page creation in accordance with an operation through the contractor terminal 20. For example, the page creation unit 14 is capable of creation using a CMS (contents management system). Note that the creation of the page content includes construction, management, update, and so forth of the web page.

The storage unit 15 stores the tag-contained information, installation attribute information, the redirection information, access analysis information, and the user information and stores a table in which those kinds of information are associated with each other. As the table stored in the storage unit 15, for example, in the present embodiment, a redirection information management table and an access analysis table are stored, the redirection information management table being for managing the redirection information for each of the NFC tags T, the access analysis table representing the access analysis for each of the NFC tags T.

Here, referring to FIG. 2 and FIG. 3, FIG. 2 illustrates a display example of the redirection information management table, and FIG. 3 illustrates a display example of the access analysis table. Those display examples are displayed on the display unit of the contractor terminal 20, and the tag information management unit 13 edits information in the storage unit 15 in accordance with an operation of the contractor terminal 20. In the following, each kind of information will be described based on those drawings.

The redirection information management table illustrated in FIG. 2 represents information of the NFC tags T for each store of the contractor. Display items of a direct information management table are store name, tag ID, redirection setting, update schedule setting, installation attribute, redirection URL, and redirection destination attribute.

In a field of the tag ID, the tag ID of the tag-contained information is displayed. In a field of the redirection setting, information about whether or not the redirection URL is set for the corresponding NFC tag T (already set or not set) is displayed. Further, in a field of the update schedule setting, information about whether or not an update schedule of the redirection URL of the corresponding NFC tag T is set (already set or not set) is displayed. The update schedule can be set through a setting change, which will be described later, and information of the update schedule is redirection period information.

In a field of the installation attribute, the installation attribute information is displayed. The installation attribute information is information about an object to which the NFC tag T is pasted or its position. The installation attribute information is capable of being set by performing selection on a pull-down menu or a direct input by an operation by the contractor, for example. In the present embodiment, as the installation attribute information, POP advertisement, exhibit, shelf A, and shelf B are set in advance and are selectable on the pull-down menu. Note that a selecting operation is a click operation or a touch operation, for example.

In a field of the redirection URL, the redirection URL information in the redirection information is displayed. Further, in a field of the redirection destination attribute, the redirection destination attribute information in the redirection information is displayed. The redirection destination attribute information is information corresponding to the page content of the redirection destination and is capable of being set by performing selection on the pull-down menu or a direct input by an operation by the contractor, for example. In the present embodiment, as the redirection destination attribute information, coupon A and coupon B which correspond to coupon pages, how-to movie A and how-to movie B which correspond to movie pages of methods of uses of products, and EC which corresponds to a page of e-commerce are set in advance and are selectable on the pull-down menu.

The redirection destination attribute information is associated with the redirection URL, and the redirection URL is automatically set by selecting the redirection destination attribute. Further, the installation attribute information is associated with the redirection information as well, and the redirection information (the redirection URL and the redirection destination attribute information) is automatically set by selecting the installation attribute. Consequently, the contractor first selects the installation attribute via the contractor terminal 20, and the redirection URL information and the redirection destination attribute information are thereby automatically set. In addition, in a case where the redirection URL information is then desired to be changed, a setting of the redirection destination attribute is changed, and the redirection URL can thereby be changed to the redirection URL which is associated with the redirection destination attribute.

Further, for the NFC tag T for which the redirection URL information has been set, a setting change button and a setting deletion button are displayed. When the setting change button is selected, a detailed setting screen which is not illustrated is displayed in a pop-up manner, and it is possible to perform detailed setting which is associated with the NFC tag T. An example of the detailed setting is the update schedule setting, and it is possible to perform setting for changing the present redirection URL which is displayed in FIG. 2 to a new redirection URL while designating a date and time. When the update schedule setting is performed, the redirection period information associated with the NFC tag T in the storage unit 15 is set, and the display in the field of the update schedule setting in FIG. 2 becomes "already set". When the set period of the update schedule is reached, the tag information management unit 13 performs switching to the new redirection URL. Further, when the setting deletion button is selected, the tag information management unit 13 deletes each piece of information which is associated with the corresponding NFC tag T in the storage unit 15, and the display in each of the fields except the fields of the tag ID in FIG. 2 is set as a blank field.

Meanwhile, for the NFC tag T for which the redirection URL information has not been set, a new setting button is displayed. When the new setting button is selected, a new setting screen is displayed in a pop-up manner although that is not illustrated, and it is possible to perform new setting which is associated with the NFC tag T. On the new setting screen, it is possible to perform setting of the installation attribute, the redirection URL, and the redirection destination attribute, and similarly to the above detailed setting screen, it is possible to perform the update schedule setting.

Further, the storage unit 15 also stores master information of the installation attribute information, the redirection URL information, and the redirection destination attribute information and information about association settings of those pieces of information although those are not illustrated. The tag information management unit 13 is capable of performing new registration, edition, and so forth about the master information and the association settings in accordance with operations of the contractor terminal 20 and the information management device 10.

The access analysis table illustrated in FIG. 3 has, as display items, the tag ID, the installation attribute, the redirection URL, and the redirection destination attribute similarly to the redirection information management table and additionally has the number of contacts. Further, a display period is also displayed. Descriptions will not be made about the same display items as those of the redirection information management table.

The display period is a period for narrowing information as a target of the access analysis and can be set in accordance with an operation through the contractor terminal 20, for example. The tag information management unit 13 performs the access analysis by extracting information, which corresponds to the set display period, from the storage unit 15 and displays results in fields of the number of contacts.

The access analysis information is displayed in the fields of the number of contacts. The access analysis information may be the number of contacts that represents the number of end user terminals 40 which have acquired the tag-contained information of the corresponding NFC tag T. In addition, as breakdowns of the number of contacts, the number of members and the number of non-members of the contractor are calculated by the tag information management unit 13 based on the user attribute information and are displayed. Further, a user attribute information check button is provided as illustrated in FIG. 3, and when this user attribute information check button is selected, detailed information based on the user attribute information is displayed.

As illustrated in the display examples in FIGS. 2 and 3, each kind of information is stored in the storage unit 15 while being associated with the information contained in the NFC tags T (specifically, the tag IDs).

Further, when one redirection URL illustrated in FIGS. 2 and 3 is selected via the contractor terminal 20, the page creation unit 14 displays, on the contractor terminal 20, a page creation screen using the CMS for the web page of a destination of the redirection URL. A specific page creation screen is not particularly limited and may be a screen by which page creation using the CMS can be performed.

<Flow of Processing>

Next, an action of the information management system 1 according to the embodiment of the present disclosure will be described with reference to a flowchart illustrated in FIG. 4.

Figure 4:
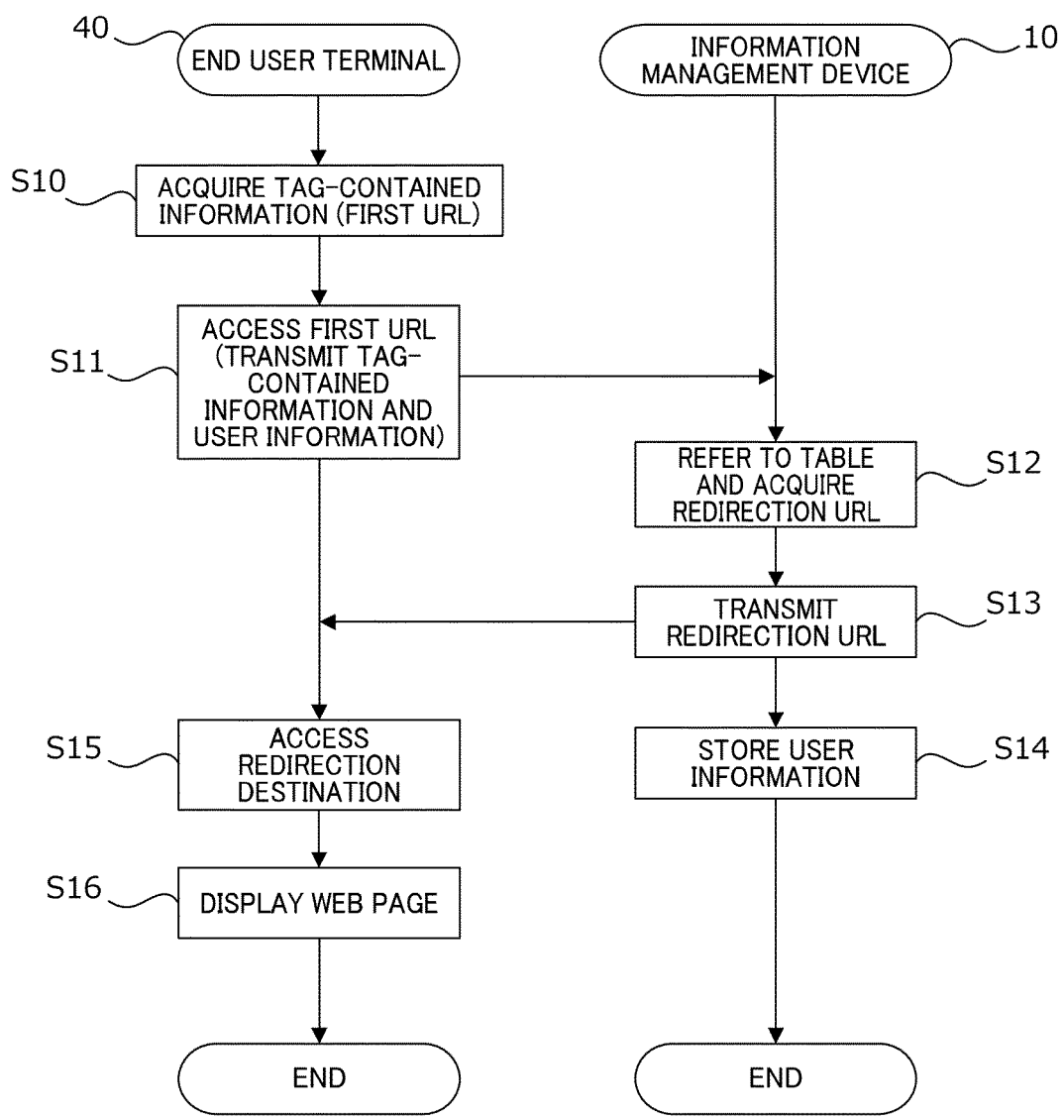
FIG. 4 is a flowchart illustrating information processing between an end user terminal and an information management device according to the embodiment of the present disclosure.

The flowchart in FIG. 4 illustrates a flowchart of information processing between the end user terminal 40 and the information management device 10. Note that this flowchart explains the action while one end user terminal 40 is set as a target, but in a case where a plurality of end user terminals 40 are present, the same action is assumed to be performed for each of the end user terminals 40.

In step S10, the end user terminal 40 uses a reading function for the NFC tag T and thereby acquires the tag-contained information from one NFC tag T.

In next step S11, the end user terminal 40 uses the first URL included in the acquired tag-contained information and thereby accesses the information management device 10 via the communication network N. In this case, the end user terminal 40 transmits, to the information management device 10, the acquired tag-contained information and the user attribute information provided in the end user terminal 40.

In step S12, the information management device 10 refers to the redirection information management table stored in the storage unit 15 and thereby acquires the redirection URL information (second URL information) which is associated with the tag ID included in the tag-contained information acquired from the end user terminal 40.

In step S13, the information management device 10 transmits the redirection URL information to the end user terminal 40.

Further, in step S14, the information management device 10 stores, in the storage unit 15, the user information which is transmitted from the end user terminal 40 in step S11 while associating the user information with the tag-contained information (for example, the tag ID) which is transmitted together with the user information. Processing on the information management device 10 side is then finished.

Meanwhile, in step S15, the end user terminal 40 uses the redirection URL information acquired from the information management device 10 and thereby accesses the web server 30 of the redirection destination.

In step S16, the end user terminal 40 displays the web page of the redirection destination. Processing on the end user terminal 40 side is then finished.

Next, information processing between the information management device 10 and the contractor terminal 20 will be described with reference to the above-described display examples in FIGS. 2 and 3.

First, the contractor terminal 20 accesses a portal site for NFC tag management, for example, of the information management device 10 and logs in (is authenticated) as the contractor. In the portal site, the redirection information management table and an access analysis result table can be selected. When the redirection information management table is selected, movement is performed to a page of the display example illustrated in FIG. 2, and when the access analysis result table is selected, movement is performed to a page of the display example illustrated in FIG. 3.

In the redirection information management table, in accordance with an operation through the contractor terminal 20, the tag information management unit 13 performs setting or edition of the installation attribute information and the redirection information (the redirection URL information, the redirection destination attribute information, and the redirection period information) which are associated with each of the tag IDs. In this case, when the installation attribute is selected, the tag information management unit 13 automatically sets the redirection URL information and the redirection destination attribute information which are in advance associated with the installation attribute. Further, when the redirection destination attribute is selected, the tag information management unit 13 automatically sets the redirection URL which is in advance associated with the redirection destination attribute.

As described above, the storage unit 15 stores, as the redirection information management table, the installation attribute information and the redirection information (the redirection URL information, the redirection destination attribute information, and the redirection period information) which are associated with the tag ID. In other words, even in a case where a large number of NFC tags T are managed, the contractor can easily perceive where or in what each of the NFC tags T is installed and what kind of web page the redirection destination of the NFC tag is. Accordingly, the contractor can easily manage a plurality of NFC tags.

Further, because the installation attribute information is associated with the redirection information (the redirection URL information and the redirection destination attribute information) and the redirection destination attribute information is associated with the redirection URL information, the contractor can set the redirection URL associated with the tag ID without manually inputting a complicated URL. Accordingly, even in a case where a large number of NFC tags T are collectively managed, setting and edition can efficiently be performed.

Further, in the access analysis table illustrated in FIG. 3, when the display period is set in accordance with an operation through the contractor terminal 20, the access analysis based on the user information is performed in accordance with the set display period. In the present embodiment, the tag information management unit 13 performs, as the access analysis, an access analysis which corresponds to user attribute values of member and non-member of the contractor. Specifically, the tag information management unit 13 calculates the number of members, the number of non-members, and the total number of contacts in the display period with respect to each of the tag IDs, the members and the non-members having acquired information from the NFC tag T, and displays the above numbers in the access analysis table. As described above, the access analysis based on the user information is performed for each of the NFC tags T, and the contractor can thereby easily perceive conditions of access to the NFC tags T and can efficiently utilize the NFC tags T. In particular, by performing the access analysis corresponding to the user attribute information such as the member and the non-member, conditions of the NFC tags can more specifically be perceived.

Further, when the redirection URL included in the redirection information management table or the access analysis table is selected by an operation of the contractor terminal, the page creation unit 14 performs display about the web page of the destination of the redirection URL on the page creation screen using the CMS. Accordingly, without separately preparing or editing the web page for each of the NFC tags T, the contractor can directly perform creation of the web page corresponding to each of the NFC tags via the information management device 10 and can thus more efficiently manage information about the NFC tag (electronic tag).

(Program)

Figure 5:
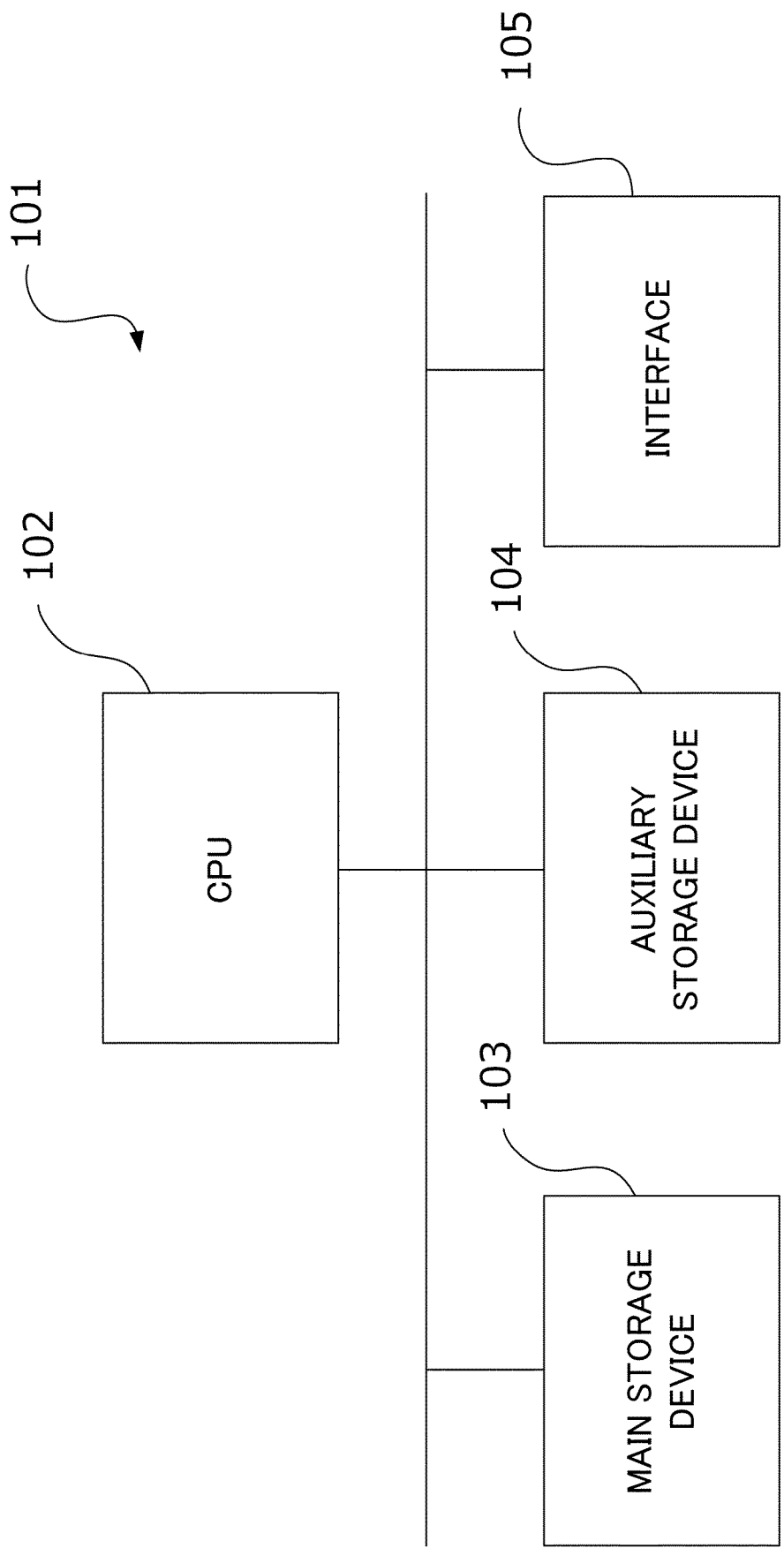
FIG. 5 is an outline block diagram illustrating a configuration of a computer.

FIG. 5 is an outline block diagram illustrating a configuration of a computer 101. The computer 101 includes a CPU 102, a main storage device 103, an auxiliary storage device 104, and an interface 105. The CPU 102 may be a GPU.

Here, a description will be made about details of a program for realizing each function which constitutes the information management device 10 according to the embodiment.

The information management device 10 is implemented in the computer 101. Further, an action of each configuration element of the information management device 10 is stored in the auxiliary storage device 104 in a form of a program. The CPU 102 reads out the program from the auxiliary storage device 104, expands that in the main storage device 103, and executes the above processing following the program. Further, following the program, the CPU 102 secures a storage area corresponding to the above-described storage unit in the main storage device 103.

Specifically, in the computer 101, the program is a program causing the computer to execute: a tag information acquisition step of acquiring tag-contained information including a tag identifier for identifying an electronic tag from an information terminal which reads information from the electronic tag; a tag information management step of referring to a storage unit which stores redirection information associated with the tag identifier, and of transmitting the redirection information, which is associated with the tag-contained information acquired by the tag information acquisition step, to the information terminal which reads the information from the electronic tag; and a page creation step of creating a page content of a redirection destination included in the redirection information from an information terminal which is authenticated as a contractor.

Note that the auxiliary storage device 104 is one example of a non-transitory and tangible storage medium. As other examples of the non-transitory and tangible storage medium, storage media can be raised such as a magnetic disk, a magneto-optical disk, a CD-ROM, a DVD-ROM, and a semiconductor memory which are connected via the interface 105.

Further, the program may be a program for realizing a part of the above-described functions. In addition, the program may be a program for realizing the above-described functions in combination with other programs which have already been stored in the auxiliary storage device 104, a so-called differential file (differential program).

In the foregoing, some embodiments of the present disclosure are described. Those embodiments can be carried out in other various forms, and various kinds of omission, substitutions, and changes can be performed without departing from the scope of the gist of the disclosure. Those embodiments and modifications thereof are included in the scope and the gist of the disclosure and are also included in the disclosure described in the claims and the equivalent scope thereof.

The invention claimed is:

1. An information management system comprising:
a tag information acquisition unit that acquires tag-contained information including a tag identifier for identifying an electronic tag from an information terminal which reads information from the electronic tag;
a storage unit that stores redirection information which is associated with the tag-contained information, wherein the storage unit receives and stores user information extracted from the information terminal and transmitted to the information management system together with the acquired tag-contained information;
a tag information management unit that is capable of referring to the storage unit and of transmitting the redirection information, which is associated with the tag-contained information acquired by the tag information acquisition unit, to the information terminal which reads the information from the electronic tag, wherein the tag information management unit automatically transmits the redirection information in response to receipt of the acquired tag-contained information; and
a page creation unit that is capable of creating a page content of a redirection destination included in the redirection information from an information terminal which is authenticated as a contractor based on the received user information extracted from the information terminal,
wherein the storage unit receives and stores user information that is extracted from the same information terminal that reads the electronic tag and transmitted to the information management system together with the acquired tag-contained information in a coordinated transmission.

2. The information management system according to claim 1, wherein the storage unit stores installation attribute information which is associated with the tag-contained information.

3. The information management system according to claim 2, wherein
the storage unit stores the installation attribute information and the redirection information, which are associated with each other, and
when the tag information management unit selects the installation attribute information, the redirection information is automatically set.

4. The information management system according to claim 1, wherein the redirection information includes URL information of the redirection destination and redirection destination attribute information.

5. The information management system according to claim 4, wherein
the storage unit stores the redirection destination attribute information and the URL information, which are associated with each other, and
when the tag information management unit selects the redirection destination attribute information, the URL information is automatically set.

6. The information management system according to claim 1, wherein
the tag information acquisition unit acquires the user information together with the tag-contained information from the information terminal which reads the electronic tag, and
the tag information management unit is capable of performing an access analysis based on the user information.

7. The information management system according to claim 6, wherein
the user information includes user attribute information, and
the tag information management unit is capable of performing the access analysis corresponding to the user attribute information.

8. The information management system according to claim 1, wherein the page creation unit creates content from an information terminal which is authenticated as a contractor based on the received user information that was extracted from the same information terminal that reads the electronic tag.

9. An information management device comprising:
a tag information acquisition unit that acquires tag-contained information including a tag identifier for identifying an electronic tag from an information terminal which reads information from the electronic tag;
a storage unit that stores redirection information which is associated with the tag-contained information, wherein the storage unit receives and stores user information extracted from the information terminal and transmitted to the information management system together with the acquired tag-contained information;
a tag information management unit that is capable of referring to the storage unit and of transmitting the redirection information, which is associated with the tag-contained information acquired by the tag information acquisition unit, to the information terminal which reads the information from the electronic tag, wherein the tag information management unit automatically transmits the redirection information in response to receipt of the acquired tag-contained information; and
a page creation unit that is capable of creating a page content of a redirection destination included in the redirection information from an information terminal which is authenticated as a contractor based on the received user information extracted from the information terminal,
wherein the storage unit receives and stores user information that is extracted from the same information terminal that reads the electronic tag and transmitted to the information management system together with the acquired tag-contained information in a coordinated transmission.

10. An information management method, wherein a computer executes:
acquiring tag-contained information including a tag identifier for identifying an electronic tag from an information terminal which reads information from the electronic tag;
storing, in a storage unit, redirection information which is associated with the tag-contained information, wherein the storage unit receives and stores user information extracted from the information terminal and transmitted to the information management system together with the acquired tag-contained information;
referring to the storage unit and transmitting the redirection information, which is associated with the tag-contained information acquired, to the information terminal which reads the information from the electronic tag, wherein the tag information management unit automatically transmits the redirection information in response to receipt of the acquired tag-contained information; and
creating a page content of a redirection destination included in the redirection information from an information terminal which is authenticated as a contractor based on the received user information extracted from the information terminal,
wherein the storage unit receives and stores user information that is extracted from the same information terminal that reads the electronic tag and transmitted to the information management system together with the acquired tag-contained information in a coordinated transmission.

11. A computer readable medium storing instructions that, when executed by a computer, perform:
acquiring tag-contained information including a tag identifier for identifying an electronic tag from an information terminal which reads information from the electronic tag;
storing, in a storage unit, redirection information which is associated with the tag-contained information, wherein the storage unit receives and stores user information extracted from the information terminal and transmitted to the information management system together with the acquired tag-contained information;
referring to the storage unit and transmitting the redirection information, which is associated with the tag-contained information acquired, to the information terminal which reads the information from the electronic tag, wherein the tag information management unit automatically transmits the redirection information in response to receipt of the acquired tag-contained information; and
creating a page content of a redirection destination included in the redirection information from an information terminal which is authenticated as a contractor based on the received user information extracted from the information terminal, wherein the storage unit receives and stores user information that is extracted from the same information terminal that reads the electronic tag and transmitted to the information management system together with the acquired tag-contained information in a coordinated transmission.

\* \* \* \* \*